United States Patent [19]

Kuhn

[11] 4,103,979
[45] Aug. 1, 1978

[54] THRUST BEARING ASSEMBLY

[75] Inventor: Earl C. Kuhn, Penn Hills Township, Allegheny County, Pa.

[73] Assignee: Westinghouse Electric Corp., Pittsburgh, Pa.

[21] Appl. No.: 838,441

[22] Filed: Sep. 30, 1977

Related U.S. Application Data

[63] Continuation of Ser. No. 720,333, Sep. 3, 1976, abandoned.

[51] Int. Cl.² ............................................. F16C 17/03
[52] U.S. Cl. .................................... 308/160; 308/139
[58] Field of Search ................... 308/26, 73, 135, 140, 308/139 R, 160, 219, 227, 229, 158

[56] References Cited

U.S. PATENT DOCUMENTS

| 1,701,078 | 2/1929 | Layne | 308/160 |
| 3,764,187 | 10/1973 | Kuhn | 308/160 |

Primary Examiner—Stephen G. Kunin
Assistant Examiner—Charles E. Frankfort
Attorney, Agent, or Firm—J. W. Keen

[57] ABSTRACT

A thrust bearing assembly for large bearings of the pivoted pad type. The assembly includes supporting structure for uniformly supporting a bearing pad's radial centerline causing the bearing pad to assume a cylindrically crowned shape with its axis extending in the radial direction of the bearing. Cylindrical crowning of the bearing pad along its radial centerline allows rotation of a supported shaft to be reversed without moving the pivot.

18 Claims, 17 Drawing Figures

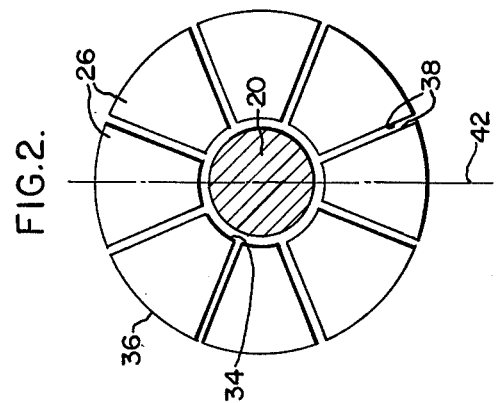
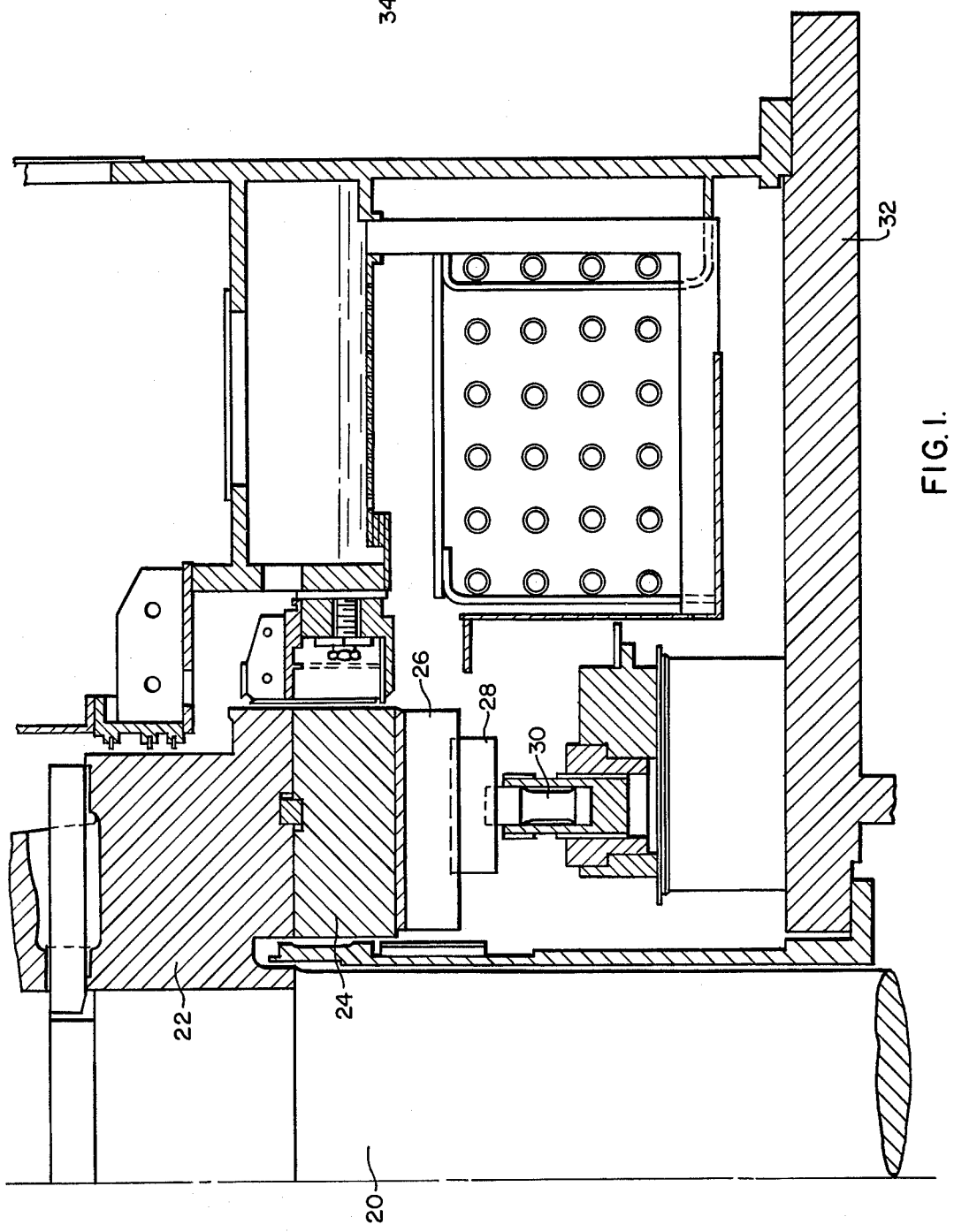

THRUST BEARING ASSEMBLY

This is a continuation of application Ser. No. 720,333 filed Sept. 3, 1976, and now abandoned.

BACKGROUND OF THE INVENTION

1. Field of the Invention

This invention relates to thrust bearing assemblies and more particularly to reversible thrust bearing assemblies of the pivoted pad type.

2. Description of the Prior Art

Large thrust bearings are usually of the type in which a thrust collar on a shaft is supported on a plurality of segmental bearing pads which are pivotally mounted to permit the pads to tilt slightly to establish a wedge-shaped oil film during operation. Long established practice requires that the bearing surface of the shoes remain planar and the pivot be circumferentially offset from the radial centerline of the thrust bearing pad. When a shaft is supported by a pivoted pad thrust bearing, the offset pivot is hydrodynamically correct for only one direction of rotation. If multi-direction shaft rotation is a design necessity such as for pump-storage generator applications, an alternative to plane, pivoted pad thrust bearing pads is required.

One proposed solution is disclosed in U.S. Pat. No. 3,784,266, where a system of grooves in the bearing pads can be selectively supplied with pressurized lubricating fluid causing a simulated offset support for centrally supported bearing pads. A further alternative is provided in U.S. Pat. No. 3,398,996 which illustrates a centrally pivoted bearing pad having two servo mechanisms which simulate the tilting bearing pad configuration for either direction of shaft rotation. Both of the aforementioned patents require building and maintaining additional lubricating systems and activating mechanisms. In addition, if the simulating or servo mechanisms have a short life, bearing life will also be decreased requiring downtime for repair. Thus, centrally pivoted thrust bearing pads are desirable for multi-direction shaft rotation, but improvement in the hydrodynamic characteristics of such a bearing is essential to prolong bearing life and enhance load carrying capacity.

SUMMARY OF THE INVENTION

In accordance with the present invention, bearing pads and supporting structure are provided wherein the supporting structure causes the bearing pads, when loaded, to assume a cylindrically crowned shape capable of carrying thrust loads exerted on shafts which have multi-directional rotation capability. The axes for such operationally cylindrically crowned shapes extend radially from the supported shaft. Furthermore, the load carrying characteristics of cylindrically crowned bearing pads are superior to those of planar surface bearing pads. In general, the bearing pads have a first surface for engaging a thrust member which is attached to a shaft and have a bending susceptibility which varies in radial directions from the shaft and is substantially constant in circumferential directions around the shaft. The supporting structure for the bearing pads provides an elastic foundation under the radial centerline of each bearing pad. The supporting structure has variable elasticity in the radial direction such that, when loaded, the elastic foundation deflects uniformly along the bearing pad's radial centerline. The elastic foundation is supported by stationary pivot members which are fixed in position.

Thus, this invention requires no additional mechanism to hydrodynamically support the thrust load of a reversibly rotatable shaft since the bearing pads, due to their construction, immediately assume the hydrodynamically optimum cylindrically crowned shape when subjected to the thrust load.

BRIEF DESCRIPTION OF THE DRAWING

The objects and advantages of this invention will become more apparent from reading the following detailed description in connection with the accompanying drawing, in which:

FIG. 1 is a partial section view of a shaft supported by a thrust bearing assembly;

FIG. 2 is a plan view of a plurality of thrust bearing pads surrounding a shaft with the shaft's thrust member, which normally engages the bearing pads, removed from the shaft;

DESCRIPTION OF THE PREFERRED EMBODIMENT

Figure 4:
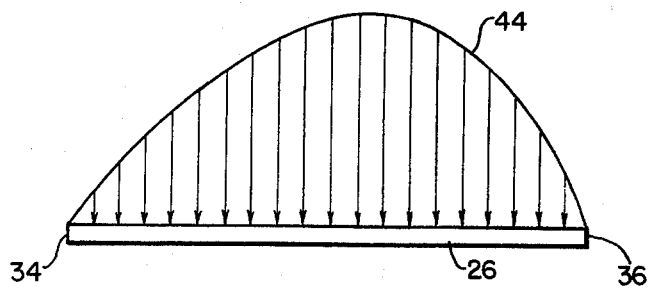
FIG. 4 is a diagram illustrating the operating forces applied to the thrust bearing pad by the thrust collar in the radial direction of the bearing.

Referring now to the drawings in detail, FIG. 1 shows a vertical machine shaft 20 with a thrust collar 22 attached thereto. Thrust collar 22 is joined with thrust runner 24 causing thrust runner 24 to rotate during shaft 20 rotation. For many applications thrust runner 24 may be deleted from the assembly for various design reasons. Several thrust bearing pads 26 are disposed about shaft 20 with one surface being in engagement with thrust runner 24 during non-rotation of shaft 20. If thrust runner 24 is deleted, bearing pads 26 would contact thrust collar 22 during non-rotation of shaft 20. During shaft 20 rotation pad 26 is separated from thrust runner 24 by a thin film of lubricating fluid. Each thrust pad 26 is supported by a bar support 28 which, in turn, is upheld by pivot 30. Pivot 30 is secured in position by machine housing 32. The structure illustrated in FIG. 1 is typical of this invention as well as previous thrust bearings.

FIG. 2 shows a plan view of eight typical thrust bearing pads 26 surrounding shaft 20 with each thrust bearing pad having an inner margin 34 adjacent to shaft 20, an outer margin 36, and edges 38. It is to be understood that the number and size of the thrust bearing pads 26 may be changed according to the application and design constraints. It can be seen that the thrust bearing pads 26 are separated by small spaces between their edges 38.

Figure 3:
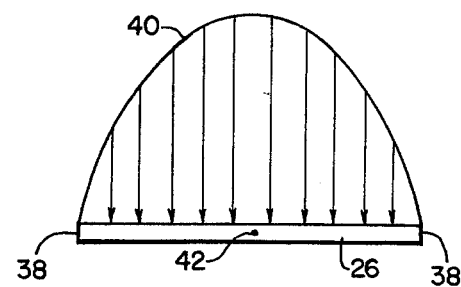
FIG. 3 is a diagram illustrating the operating forces applied to a centrally supported thrust bearing pad by a thrust collar in the circumferential direction of the bearing.

FIG. 3 illustrates the oil pressure loading on centrally pivoted thrust bearing pads 26 as viewed from outer margin 36. The pressure loading shown in the circumferential direction of FIG. 3 is parabolic and generally symmetrical about the radial centerline 42 of thrust bearing pad 26. The oil distribution pressure exerted on thrust bearing pad 26 during bearing operation is illustrated in FIG. 4 as viewed along radial centerline 42. The pressure distribution generally increases from the radial inner margin 34 and radial outer margin 36 reaching a maximum therebetween.

Figure 5A:
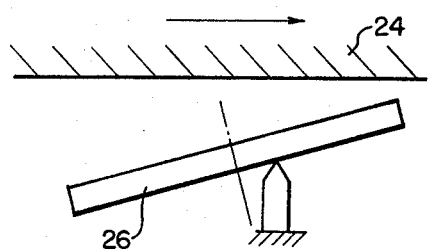
FIGS. 5A and 5B illustrate the hydrodynamically ideal positions of the pivoted supports for plane surfaced bearing pads for different directions of shaft rotation as indicated by the arrows.
Figure 5B:
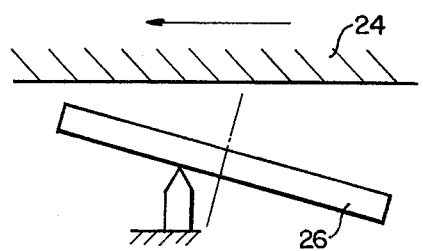

FIGS. 5A and 5B illustrate hydrodynamically optimized circumferential locations for a pivotally supported thrust bearing pad 26 for opposite rotation directions of thrust runner 24. It can be shown that a thrust bearing pad which assumes a cylindrically crowned shape under load can have a superior load carrying capability to that of a plane thrust bearing pad with offset pivot as illustrated in FIGS. 5A and 5B.

Figure 6A:
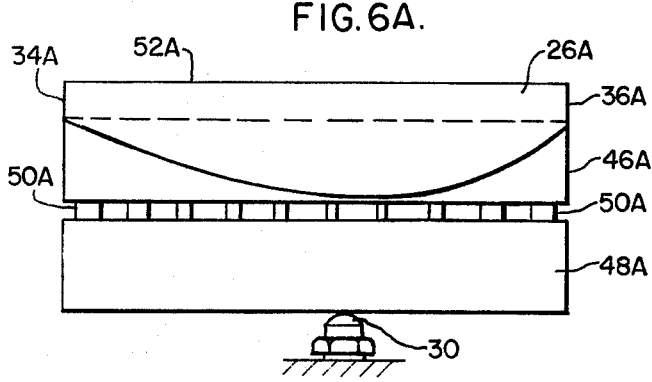
FIG. 6A is an elevation view of a first embodiment of this invention taken from the radial direction of the bearing and FIG. 6B is an elevation view of the invention shown in FIG. 6A taken from the circumferential direction of the bearing.
Figure 6B:
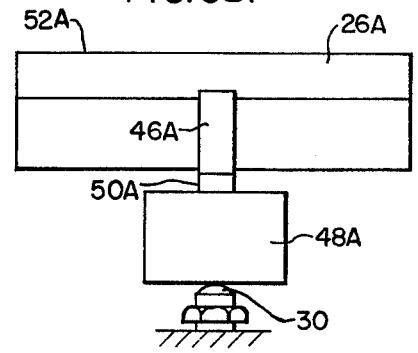
Figure 7C:
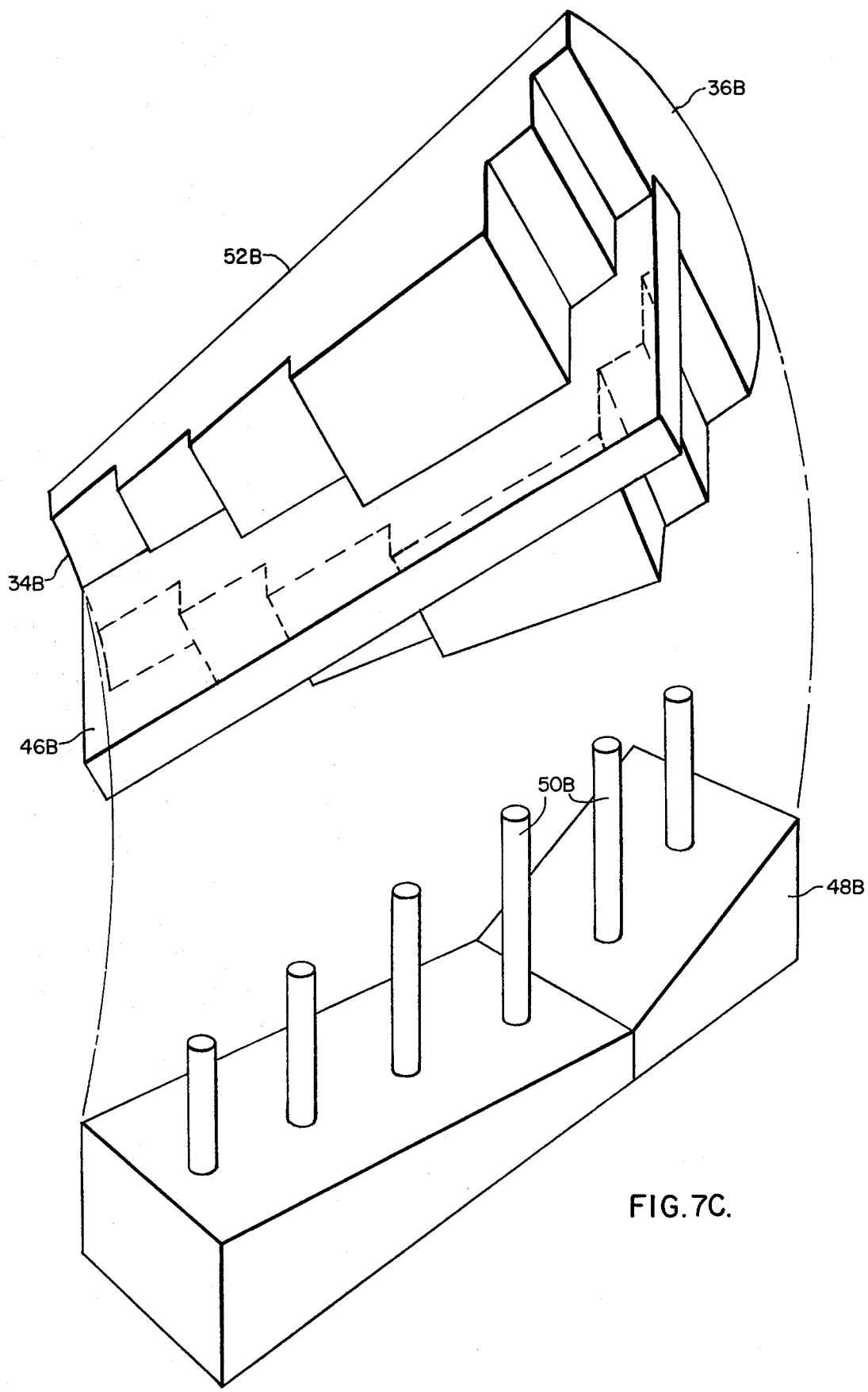
FIG. 7C is an exploded isometric view of the invention shown in FIGS. 7A and 7B.
Figure 7A:
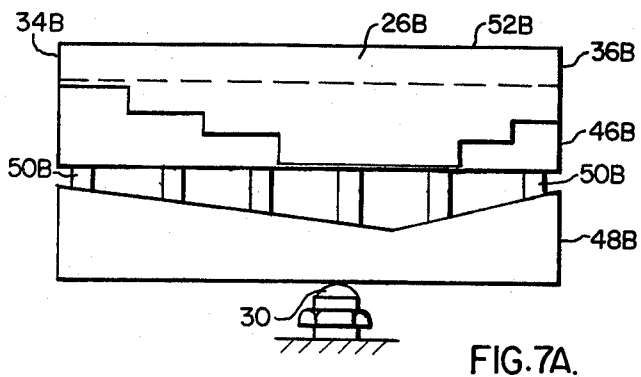
FIG. 7A is an elevation view of a second embodiment of this invention taken from the radial direction of the bearing.
Figure 7B:
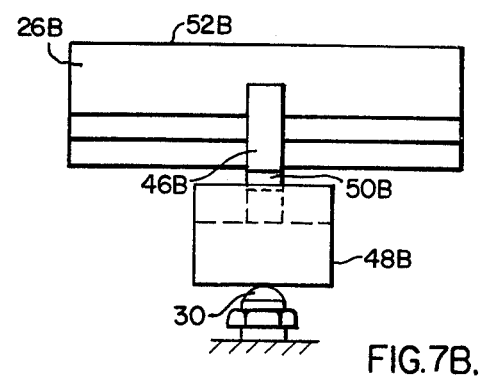
FIG. 7B is an elevation view of the invention as shown in FIG. 7A taken from the circumferential direction of the bearing.
Figure 8A:
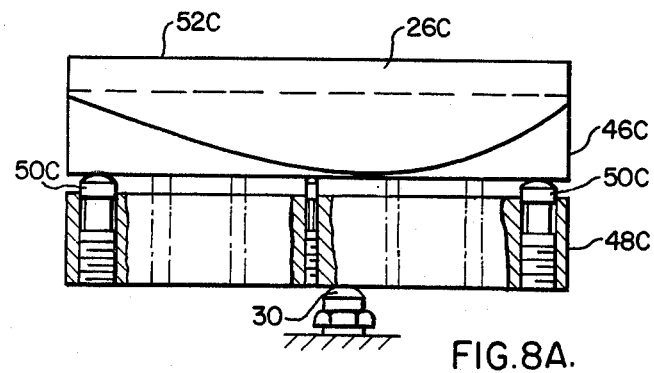
FIG. 8A is an elevation view of a third embodiment of this invention taken from the radial direction of the bearing and FIG. 8B is an elevation view of the invention as shown in FIG. 8A taken from the circumferential direction of the bearing.
Figure 8B:
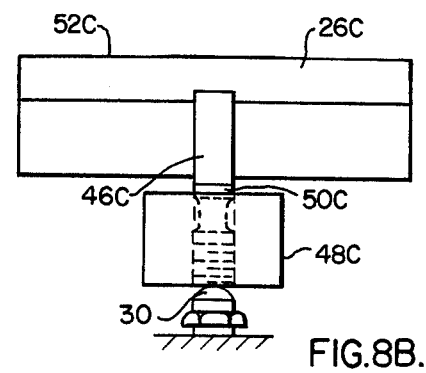

A thrust bearing pad 26A as shown in FIGS. 6A and 6B will assume a cylindrically crowned shape when put under load and viewed from the circumferential direction of the thrust bearing. Thrust bearing pad 26A has a key 46A which extends from the inner margin 34A to the outer margin 36A of thrust bearing pad 26A. Key 46A which lies along thrust bearing pad 26A's radial centerline is supported by an elastic foundation made from beam 48A and lugs 50A. Lugs 50A are of varying width in the radial direction, constant thickness in the circumferential direction, and constant length. By using lugs of variable cross-sectional area, key 46A can be made to uniformly deflect along its length when bearing pad 26A is put under load. By varying the thickness of thrust bearing pad 26A in the radial direction, surface 52A can be made to assume a cylindrically crowned, convex shape relative to thrust runner 24 with the cylinder's axis extending in the radial direction. In addition, a cylindrically crowned surface when supported at its centerline, can be hydrodynamically optimized for either direction of rotation for thrust runner 24. FIGS. 7A and 7B illustrate an alternative construction for thrust pad 26B, lugs 50B, and beam 48B. Thrust bearing pad 26B has step changes in its thickness along its radial direction. Lugs 50B are shown to be of variable length in the radial direction and cooperate with beam 48B to produce the desired effect of allowing key 46B and the radial centerline of thrust bearing pad 52B to deflect uniformly in the radial direction when subjected to operating load. FIGS. 8A and 8B demonstrate a third construction for thrust bearing pad 26C, beam 48C, and variable diameter lugs 50C. By varying the diameter of lug 50C the elasticity in the radial direction can be varied to allow uniform deflection of key 46C. Also by varying the radial thickness of thrust pad 26C, surface 52C will form a nearly perfect cylindrically crowned surface whose axis extends in the radial direction when loaded.

Figure 9A:
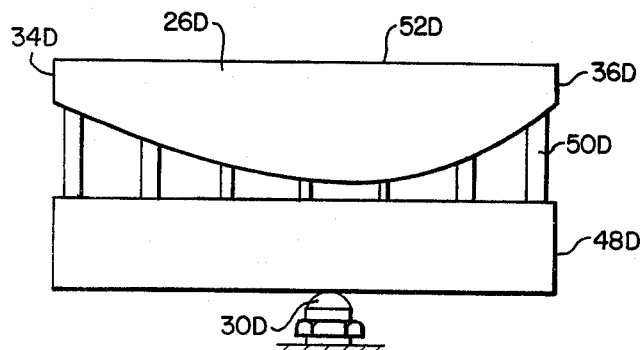
FIG. 9A is an elevation view of a fourth embodiment of this invention taken from the radial direction of the bearing and FIG. 9B is an elevation view of the invention shown in FIG. 9A taken from the circumferential direction of the bearing.
Figure 9B:
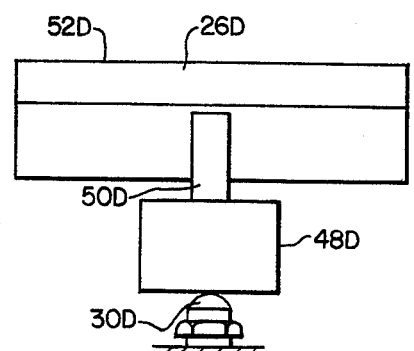
Figure 10A:
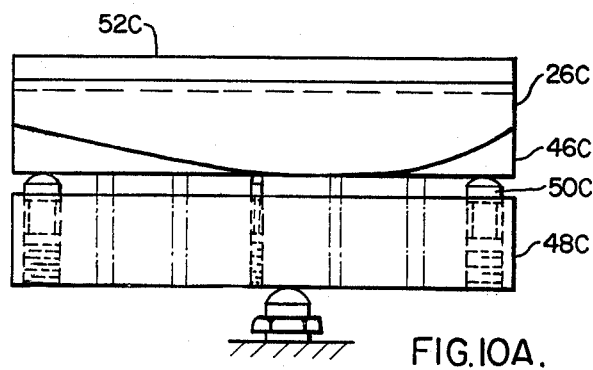
FIGS. 10A and 10B are elevation views of the third embodiment of this invention under load taken from the radial and circumferential directions of the bearing respectively.
Figure 10B:
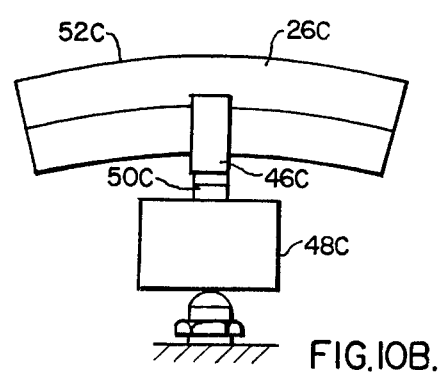

FIGS. 10A and 10B illustrate the radial and circumferential views respectively of the thrust bearing pad 26C, key 46C, beam 48C, and lug 50C when thrust bearing pad 26C is subjected to operating loads. Various other methods of controlling the supporting elasticity of the thrust bearing pads may be developed by varying the cross-sectional area of lug 50, the length of lug 50, or both. Leveling key 46 is not always necessary, but is useful in increasing the stiffness of thrust pad 26's radial centerline 42 and in reducing manufacturing problems associated with making thrust pad 26. FIGS. 9A and 9B show the radial and circumferential views respectively of a thrust bearing pad 26D without a key along its radial centerline. In this configuration lugs 50D extend from beam 48D and directly contact the curved surface of thrust bearing pad 26D.

It is to be understood that operating loads may cause hydrodynamic pressure, thermal effects, other forces, or any combination thereof which, in turn, may induce bearing pad deflection. By causing surface 52 to assume a cylindrically crowned shape, hydrodynamic operation of the thrust bearing is correct for shaft rotation in either direction and load carrying capacity is enhanced over that of the offset pivot design supporting a plane thrust bearing pad.

I claim:

1. An apparatus having a rotatable shaft with a thrust member affixed thereto, said shaft's axial displacement being restrained by a thrust bearing assembly, said thrust bearing assembly comprising:

a plurality of bearing pads disposed about said shaft with each pad having a first surface for engaging said thrust member, said first surfaces, when loaded, being deformable into substantially cylindrically crowned surfaces each with their axis extending in the radial direction;

means for providing an elastic foundation for each bearing pad's radial centerline, said elastic foundation being narrow in said circumferential direction and having variable elasticity in said radial direction such that said foundation deflects uniformly along said radial centerline when said bearing pads are subjected to operating loads; and a plurality of stationary pivot members each of which is fixed in position and provides support for said elastic foundation means.

2. The thrust bearing assembly of claim 1, wherein each of said bearing pads has a thickness which radially increases from both an inner and an outer margin and reaches a maximum thickness at a radial location where the operating load to be exerted thereon is greatest.

3. The thrust bearing assembly of claim 2, wherein said bearing pad's thickness changes in discrete, discontinuous steps in said radial directions.

4. The thrust bearing assembly of claim 2, wherein said bearing pad's thickness changes continuously in said radial direction.

5. The thrust bearing assembly of claim 1, wherein each of said bearing pads has a thickness which is constant in said circumferential direction.

6. An apparatus having a rotatable shaft with a thrust member affixed thereto, said shaft's axial displacement being restrained by a thrust bearing assembly, said thrust bearing assembly comprising:

a plurality of bearing pads disposed about said shaft with each pad having a first surface for engaging said thrust member and a circumferentially narrow portion along said pad's radial centerline of generally constant bending susceptibility, said first surfaces, when loaded, are deformable into substantially cylindrically crowned surfaces each with their axis extending in the radial direction and having radially varying bending susceptibility about each pad's radial centerline;

means for providing an elastic foundation for each bearing pad's radial centerline, said elastic foundation being circumferentially narrow and having variable elasticity in said radial direction such that said foundation deflects uniformly along said radial centerline when said bearing pads are subjected to operating loads; and a plurality of stationary pivot members each of which is fixed in position and provides support for each elastic foundation means.

7. The thrust bearing assembly of claim 6, wherein said radially varying bending susceptibility is provided by radially increasing the thickness of each of said bearing pads from both an inner and an outer margin thereof, reaching a maximum thickness at a radial location where the operating load to be exerted thereon is greatest.

8. The thrust bearing assembly of claim 7, wherein said thrust bearing pad's variable thickness changes in discrete, discontinuous steps in said radial direction.

9. The thrust bearing assembly of claim 7, wherein said thrust bearing pad's variable thickness changes continuously in said radial direction.

10. The thrust bearing assembly of claim 6 wherein said constant bending susceptibility is maintained by keeping said bearing pad's thickness unchanged along said bearing pad's radial centerline portion.

11. An apparatus having a rotatable shaft with a thrust member affixed thereto, said shaft being axially restrained by a thrust bearing assembly, said thrust bearing assembly comprising:

a plurality of bearing pads situated about said shaft with each pad having a first surface for engaging said thrust member and having an axial thickness which varies in the radial direction and is maximum where operating loads exerted thereon are greatest;

an elastic foundation for each bearing pad's radial centerline, said elastic foundation being narrow in said circumferential direction and having variable elasticity in said radial direction such that said foundation deflects uniformly in said radial direction along said radial centerline when said bearing pads are subjected to operating loads; and a plurality of stationary pivot members each of which provides support for each elastic foundation wherein, said first surfaces, when loaded, deform into substantially cylindrically crowned surfaces each with their axis extending in the radial direction.

12. An apparatus having a rotatable shaft with a thrust member affixed thereto, said shaft being axially restrained by a thrust bearing assembly, said thrust bearing assembly comprising:

a plurality of bearing pads disposed about said shaft with each pad having a first surface for engaging said thrust member, having a circumferentially narrow portion along each of said pad's radial centerline of generally constant bending susceptibility, and having radially varying bending susceptibility about each pad's radial centerline;

an elastic foundation for each bearing pad's radial centerline, said elastic foundation being narrow in said circumferential direction and having variable elasticity in said radial direction such that said foundation deflects uniformly in said radial direction along said radial centerline when said bearing pads are subjected to operating loads; and a plurality of stationary pivot members each of which provides support for each elastic foundation wherein, said first surfaces, when loaded, deform into substantially cylindrically crowned surfaces each with their axis extending in the radial direction.

13. An apparatus having a rotatable shaft with a thrust member associated therewith, said shaft being axially restrained by a thrust bearing assembly, said thrust bearing assembly comprising:

a plurality of bearing pads disposed about said shaft with each pad having a first surface for engaging said thrust member wherein said first surfaces, when loaded, are deformable into substantially cylindrically crowned surfaces with their axis extending in the radial direction;

means for providing an elastic foundation for each bearing pad's radial centerline, said foundation means being uniformly deflectable along each bearing pad's radial centerline when said bearing pads are subjected to operating loads; and a plurality of stationary pivot members each of which is fixed in position and provides support for said elastic foundation means.

14. The thrust bearing assembly of claim 13 wherein said bearing pads each have a thickness which radially increases from both an inner and an outer margin of said bearing pads and reaches a maximum thickness at an intermediate radial location.

15. The thrust bearing assembly of claim 14 wherein said bearing pad's thickness changes in discrete, discontinuous steps in said radial directions.

16. The thrust bearing assembly of claim 14 wherein said bearing pad's thickness changes continuously in said radial directions.

17. The thrust bearing assembly of claim 14 wherein said intermediate radial locations of maximum bearing pad thickness coincide with the regions of maximum operating load.

18. The thrust bearing assembly of claim 14 further comprising:

a circumferentially narrow portion along each bearing pad's radial centerline which is substantially less deformable than the remainder of the bearing pad wherein said narrow portion provides a contact area for said foundation means and ensures relative bearing pad deflection on both circumferential sides thereof when said bearing pads are subjected to operating loads.

* * * * *